(12) United States Patent
Schmidt

(10) Patent No.: US 8,695,187 B2
(45) Date of Patent: Apr. 15, 2014

(54) DEVICE FOR PROCESSING CLIPS, SCREWS, PINS, NUTS OR SIMILAR JOINING ELEMENTS

(76) Inventor: Heiko Schmidt, Lappersdorf (DE)

( * ) Notice: Subject to any disclaimer, the term of this patent is extended or adjusted under 35 U.S.C. 154(b) by 179 days.

(21) Appl. No.: 12/735,619

(22) PCT Filed: Feb. 3, 2009

(86) PCT No.: PCT/DE2009/000146
§ 371 (c)(1),
(2), (4) Date: Aug. 3, 2010

(87) PCT Pub. No.: WO2009/097837
PCT Pub. Date: Aug. 13, 2009

(65) Prior Publication Data
US 2010/0325879 A1    Dec. 30, 2010

(30) Foreign Application Priority Data
Feb. 5, 2008 (DE) .......... 10 2008 007 817
Dec. 5, 2008 (DE) .......... 10 2008 060 476

(51) Int. Cl.
*B23P 11/00* (2006.01)

(52) U.S. Cl.
USPC ............ 29/243.53; 29/811.2

(58) Field of Classification Search
USPC ........ 29/524.1, 525.01, 798, 809, 811.2, 813, 29/814, 816, 281.1, 243.56, 243.53, 29/243.526; 221/197, 287, 312 B; 227/120, 107, 2
See application file for complete search history.

(56) References Cited

U.S. PATENT DOCUMENTS

| | | | |
|---|---|---|---|
| 3,886,783 A * | 6/1975 | Hirsch ................. | 29/812.5 |
| 4,208,153 A | 6/1980 | Trethewy | |
| 4,463,888 A * | 8/1984 | Geist et al. ............ | 227/109 |
| 4,773,156 A | 9/1988 | Kurita | |
| 4,903,522 A * | 2/1990 | Miller ............. | 29/243.525 |
| 5,104,024 A * | 4/1992 | Brewer et al. ............ | 227/2 |
| 5,193,717 A | 3/1993 | Rink et al. | |
| 6,343,730 B2 * | 2/2002 | Benes et al. .......... | 227/119 |
| 6,978,698 B2 * | 12/2005 | Hofbrucker et al. ...... | 81/57.37 |
| 8,047,416 B2 * | 11/2011 | Davies et al. .......... | 227/120 |

FOREIGN PATENT DOCUMENTS

DE    69008769    10/1994
FR    2662622    12/1991

* cited by examiner

*Primary Examiner* — Lee D Wilson
*Assistant Examiner* — Steven A Maynard
(74) *Attorney, Agent, or Firm* — Welsh Flaxman & Gitler LLC

(57) ABSTRACT

The invention relates to a novel device for attaching components, particularly clips, screws, nuts, or similar joining elements, to workpieces, made up of a swage head for placing the respective joining element onto a workpiece and having a supply station for feeding the joining elements at the swage head.

11 Claims, 5 Drawing Sheets

DEVICE FOR PROCESSING CLIPS, SCREWS, PINS, NUTS OR SIMILAR JOINING ELEMENTS

BACKGROUND OF THE INVENTION

The invention relates to a device for processing clips, screws, bolts, rivets, blind rivets, nuts, blind nuts or similar connecting elements.

Processing or setting tools for processing connecting elements, also in the form of clips or clamping nuts from a magazine, are known in the art and offer the general advantage that during processing, a connection to a feed unit supplying the connecting elements via relatively heavy and rigid supply hoses supplying the connecting elements is not necessary, so that such setting tools can be designed to be lightweight and convenient, making them very user friendly.

The disadvantage of such pre-existing setting tools, however, is that they require connecting elements in belt form, i.e. in a form in which the connecting elements are literally provided on a belt made of a suitable material, for example of plastic and/or paper and then separated from this belt during processing in the setting tool, or are connected with each other to form a unit accommodated in the magazine of the setting tool, in the form of material sections that can be separated during processing. This belt method not only involves additional expense, but also in many ways severely limits the freedom of the design of the connecting elements, in particular for adaptation to special requirements.

Also known are setting heads, in particular for use in automatic systems, which are fed with the connecting elements to be processed by means of flexible supply lines or hoses, which are constantly connected with the respective setting head. For many applications, these setting heads cannot be used or can be used only to a limited extent, especially if the processing or setting of connecting elements needs to take place manually, i.e. through manual operation of the setting head. The relatively heavy weight and the limited flexibility of the supply line connected with the setting head for feeding the connecting elements restricts and impedes the handling of these units.

It is an object of the invention is to present a device which avoids the aforementioned disadvantages and enables processing of connecting elements provided as bulk material in a simplified manner.

SUMMARY OF THE INVENTION

In the device according to the invention, which is used to process clips, screws, bolts, rivets, blind rivets, nuts, blind nuts, etc., the setting head for processing or for setting the connecting elements is part of a setting tool, which in addition to the setting head also comprises at least one magazine for holding a supply of non-belted connecting elements, so that the connecting elements can be processed from out of the magazine, namely without a connection between the setting tool and the supply station for feeding additional connecting elements.

In the device according to the invention, the connecting elements are set for example by means of screwing, pressing, pulling, pushing, or combinations of these means.

The at least one setting tool can be docked onto a supply station, namely for automatic refilling of its magazine with the non-belted connecting elements.

In a preferred embodiment, at least two setting tools are provided, so that during processing of the connecting elements present in the magazine of one setting tool, the other setting tool is filled with the connecting elements. For this purpose, the supply station is then designed for example with a docking position for each setting tool.

Connecting elements according to the invention are in particular clips, also in the form of clip-like connecting elements or clamping nuts, but also screws, nuts, bolts, etc.

The setting tool is, for example, a hand-held tool with which the connecting elements are set or processed manually. However, the at least one setting tool can also be part of a system, for example, a robot system for automatic processing of connecting elements.

Further embodiments, advantages and possible applications of the invention are disclosed in the following description of exemplary embodiments and accompanying drawings. All characteristics described and/or pictorially represented, alone or in any combination, are subject matter of the invention, regardless of their being summarized or referenced in the claims.

BRIEF DESCRIPTION OF THE DRAWINGS

The invention is described below in detail based on exemplary embodiments with reference to the drawings, in which.

DETAILED DESCRIPTION OF THE INVENTION

Figure 1:
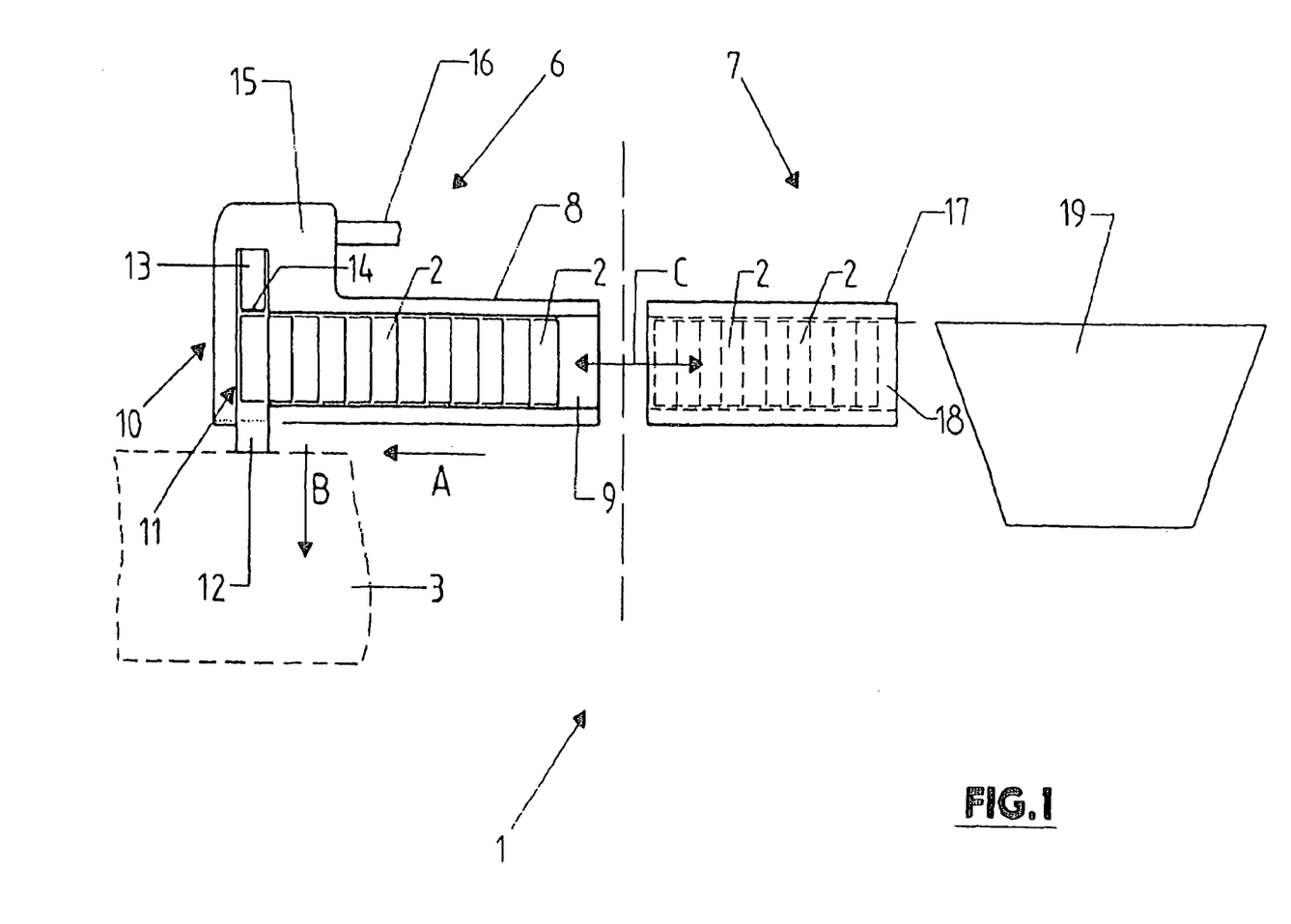
FIG. 1 shows in a very schematic functional depiction a device according to the invention for processing or setting connecting elements in the form of clamping nuts.
Figure 2:
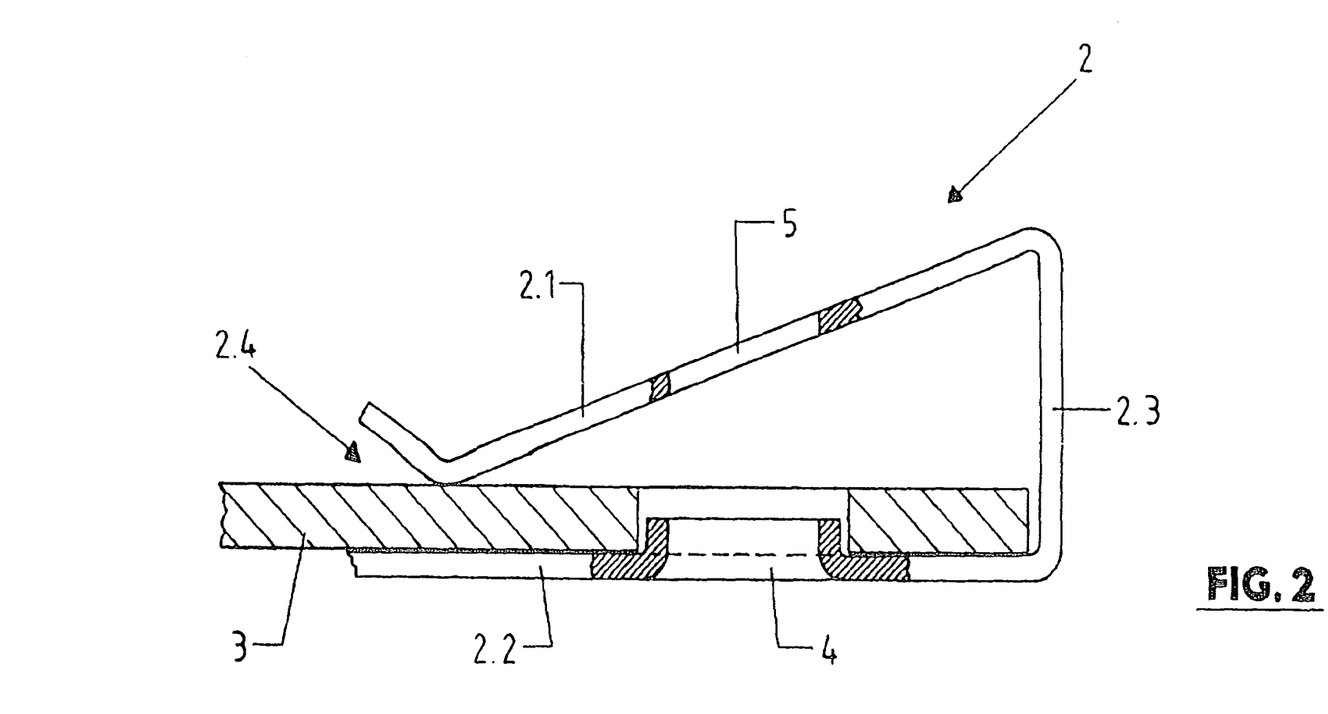
FIG. 2 shows in an enlarged component drawing a clamping nut after being pushed onto a workpiece.

The device generally designated 1 in FIG. 1 is used for setting or placing clamping nuts 2 on workpieces 3, for example on workpieces 3 manufactured from sheet metal, by stamping and bending so that the respective clamping nut 2 overlaps the respective workpiece 3 in the manner of a tab for example in the area of a workpiece edge. The clamping nuts 2 are designed for this purpose in the known manner as clips, namely essentially consisting of the two legs 2.1 and 2.2 and of a yoke section 2.3 connecting these two legs. The leg 2.2 is provided with an internally threaded bore 4, opposite of which a matching recess 5 is allocated in the leg 2.1. The clamping nuts 2 are manufactured for example from spring sheet steel or a suitable plastic. Clamping nuts of this type are known to persons skilled in the art.

The device 1 in the depicted embodiment consists of two separate functional elements or units, namely of a mobile setting tool 6 and a filling or loading station 7. The setting tool 6 contains within a housing 8 one magazine 9 formed essentially by a guide for holding a supply of non-belted or not mutually connected clamping nuts 2. In the depicted embodiment the clamping nuts 2 in the magazine 9 are arranged closely adjacent to each other so that they respectively lie against each other with the end 2.4 open toward the yoke section 2.3 pointing downward and oriented with their legs 2.1 and 2.2 perpendicular or crosswise to the longitudinal extension of the magazine 9. By feed means not depicted, for example by a carrier or pusher under the effect of at least one spring element the clamping nuts 2 accommodated in the magazine 9 are preloaded in the direction of arrow A to a head end of the setting tool 6 or to the setting head 10 there.

At the setting head 10 the magazine 9 or the guide forming said magazine ends in a supply position 11, which is also the upper end of a joining channel 12 forming the processing position, which (joining channel) is open on a bottom side of the setting tool 6 in the area of the head end 10 and has a cross section which is adapted to the clamping nuts 2, so that the respective first clamping nuts 2 provided in feed direction A in the magazine 9 and therefore at the supply position 11 can be brought out in direction of arrow B with their open side 2.4 front first and secured against twisting in the joining channel 12 and pushed onto the workpiece 3. For pushing or setting the respective clamping nuts 2, a feed element, e.g. ram 13 is provided, which with its lower ram surface 14 in FIG. 1 forms a contact surface for the yoke section 2.3 of the respective clamping nuts 2 while being pushed out or set (arrow B). The ram 13 can be moved by an actuating mechanism 15.

The actuating mechanism 15, which for example is activated by an actuating lever (not depicted) provided on the setting tool 6, comprises for example a pneumatic piston-cylinder arrangement for moving the ram 13 during setting, as well as spring means for the return movement of the ram 13 to its starting position. The actuating mechanism 15 is supplied by a supply line or a supply hose 16.

The fixed supply station 7 is designed so that the setting tool 6 can be docked and undocked at a docking position on the docking station 7 (double arrow C), in particular so that after docking the magazine 9 of the setting tool 6 is automatically refilled by means of the supply station 7 with clamping nuts 2, so that the magazine 9 then again contains the maximum possible number of clamping nuts 2.

The supply station 7 in the depicted embodiment is designed in a housing 17 with a buffer zone or a buffer magazine 18, namely for holding a plurality of clamping nuts 2, which are provided in this buffer zone 18 in non-belted form, i.e. not mutually connected and closely following each other, in an orientation which corresponds to the orientation of the clamping nuts 2 in the magazine 9. After docking of the setting tool 6 on the supply station 7 the end of the magazine 9 furthest away from the setting head 10 adjoins an end of the buffer zone 18 so that the clamping nuts 2 can be refilled from the buffer zone 18 into the magazine 9.

The supply station 7 further comprises a connecting element feed unit 19, which in the depicted embodiment is formed by a vibrating or oscillating pot and which serves to hold a plurality of clamping nuts 2 in loose form or as bulk material. The buffer zone 18 is supplied with clamping nuts 2 from the connecting element feed unit 19 via a guide with corresponding baffles, so that the buffer zone 18 is always filled with the required number of clamping nuts 2 and the clamping nuts 2 in the buffer zone 18 are always oriented correctly or as required.

The supply station 7 for example also supplies the power required for actuation of the setting tool 6 or of the ejecting element or ram 13 there, for example in the form of compressed air.

One of the advantages of the device 1 is that the setting tool 6 can be designed to be small and very convenient, making it possible to set the clamping nuts 2 also in hard-to-access areas of workpieces 3. The setting tool 6 can be oriented as required to the contour or orientation of the area of a workpiece 3 to be supplied with the respective clamping nuts 2, i.e. the setting tool 6 enables not only setting of the respective clamping nuts 2 in vertical direction from top to bottom, but also in any other axial direction.

The convenient design of the setting tool 6 results in particular from the fact that the setting tool 6 exhibits a relative simple and lightweight construction and also that supply lines or hoses for supplying the clamping nuts 2 are avoided. The supply line 16 can be designed to be very lightweight and flexible, as opposed to conventional supply hoses.

If the clamping nuts 2, as described above, are oriented in the magazine 9 so that they are oriented with the open side 2.4 toward the bottom side of the setting tool 6, i.e. each clamping nut 2 at the processing or supply position 11 is facing the joining channel 12 with the open side 2.4, then an especially simple construction results due to the fact that only one movement in a single axial direction is necessary to set each clamping nut 2, namely a movement of the ejecting element or ram 13 in the direction of arrow B.

A general advantage of the described device 1 is that the clamping nuts 2 of the filling or supply station 7 can be fed as loose bulk material, which avoids the disadvantages of the belt technology commonly used in the past.

Figure 3:
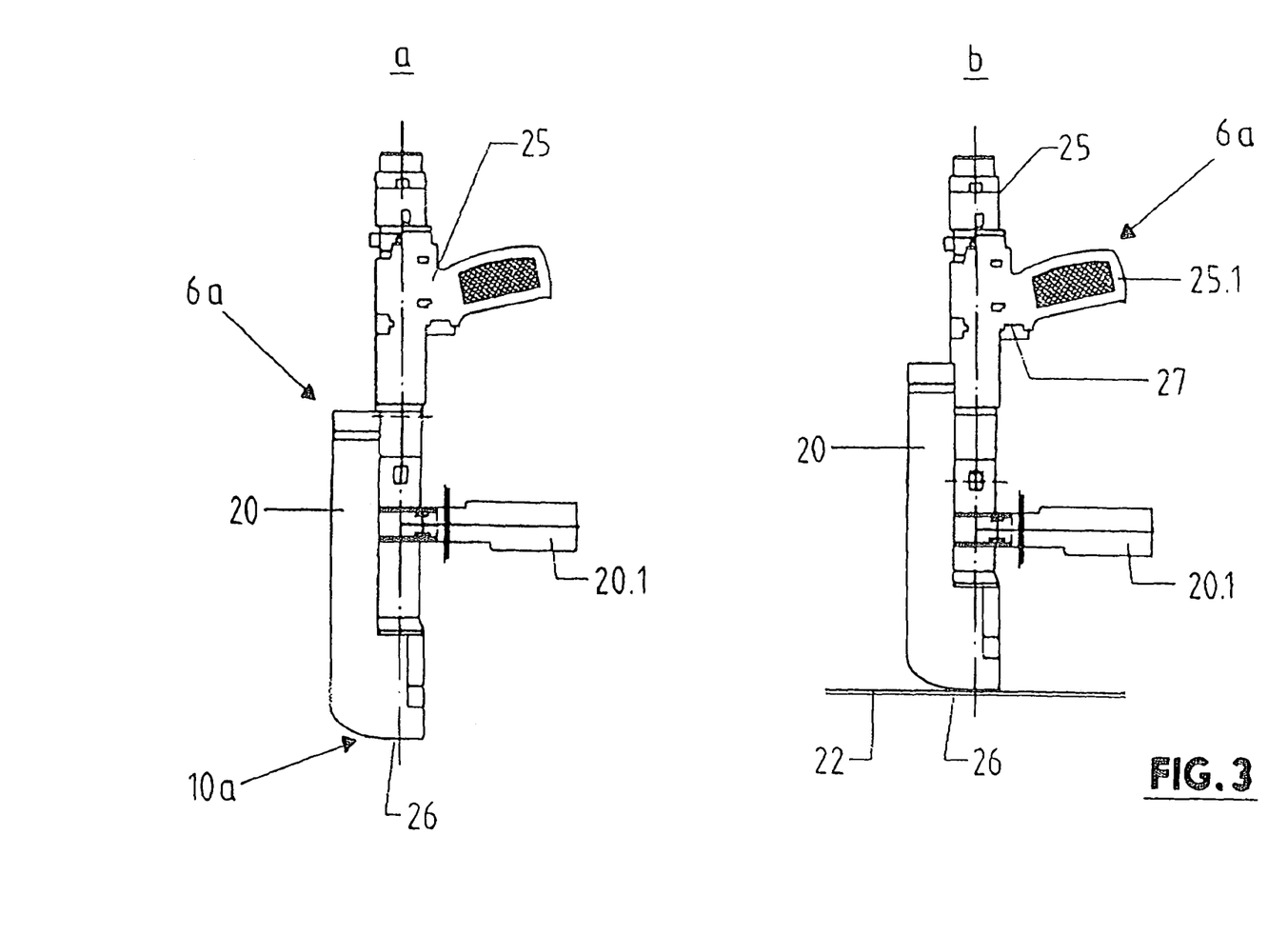
FIG. 3 shows in a simplified depiction a setting tool according to the invention in the form of a screwing tool in supply or starting position (position a) and in working position (position b)
Figure 4:
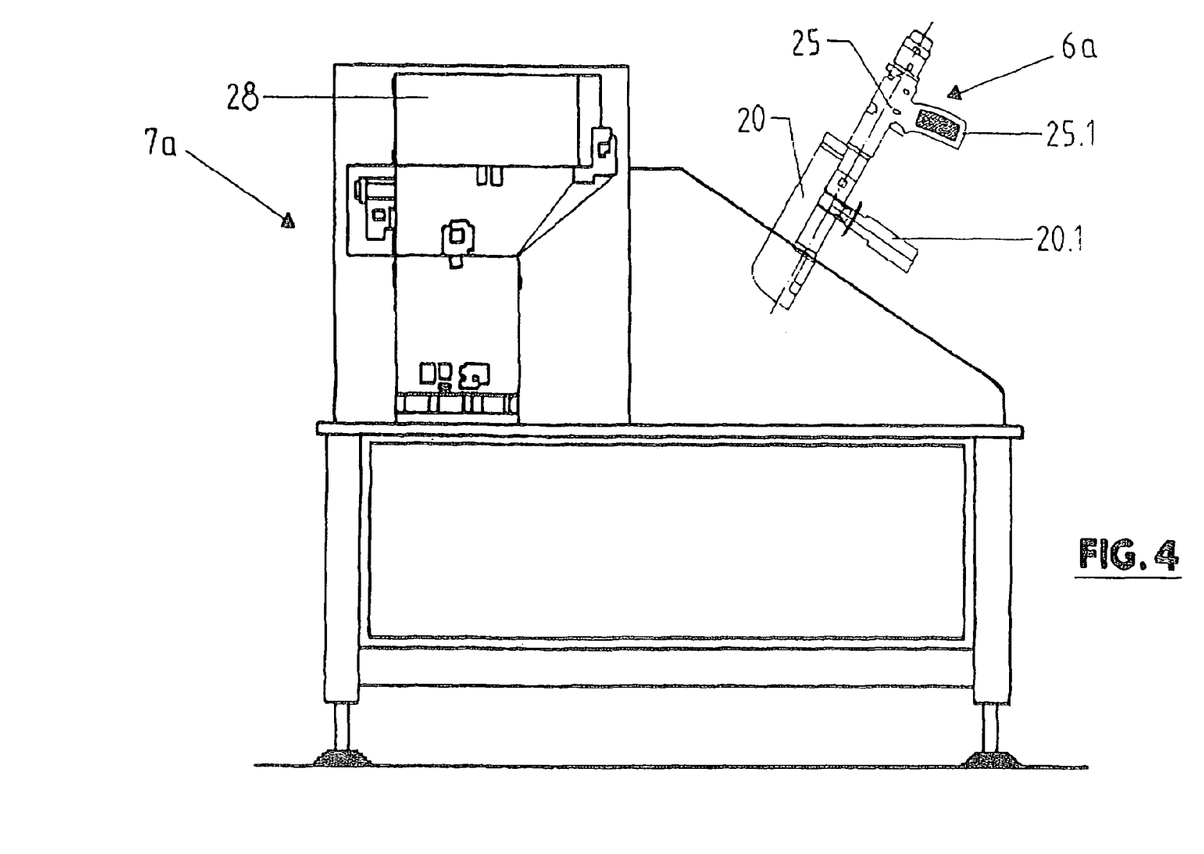
FIG. 4 shows a supply station for the setting tool of FIG. 3.
Figure 5:
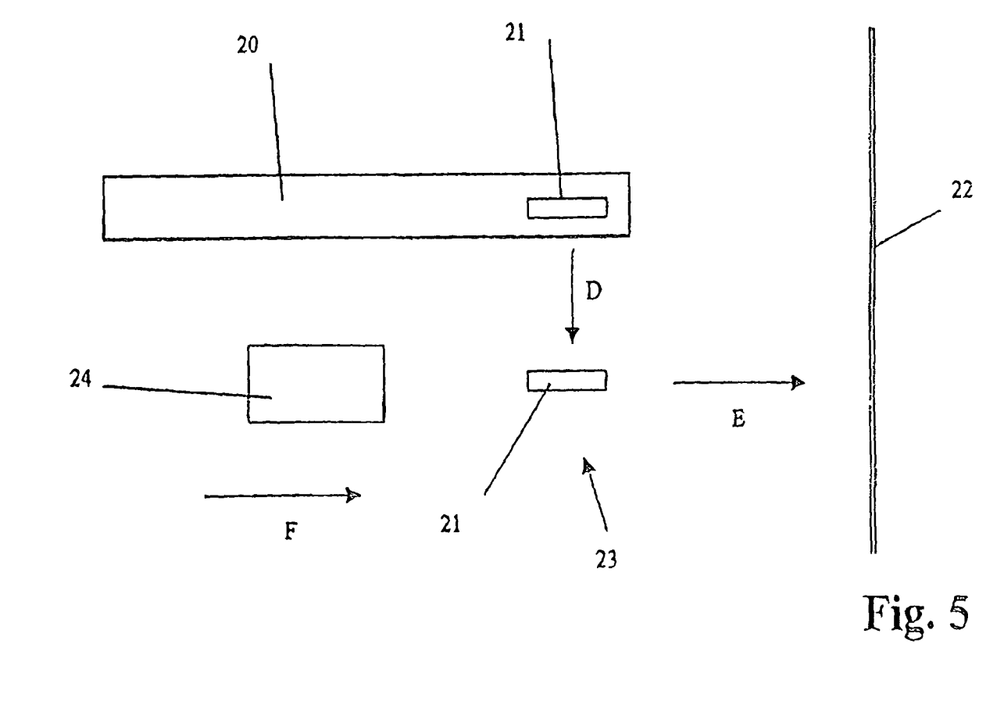
FIG. 5 shows in a schematic depiction the functional process during supply and setting of a connecting element with the setting tool of FIG. 3.

FIGS. 3 and 4 show in a simplified depiction a setting tool 6a and a supply station 7a for loading the setting tool 6a or the magazine 20 provided on said setting tool with connecting elements, which are depicted in FIG. 5 very schematically by 21 and in this embodiment are screws, for example self-cutting screws. The setting tool 6a is therefore a "screw driver" for inserting the connecting elements 21 embodied as screws in workpieces 22.

The magazine 20 of the setting tool 6a is likewise used for holding a supply of connecting elements 21, which are provided consecutively in the magazine in a pre-defined orientation. For insertion of the connecting elements 21 in the likewise only very schematically depicted workpiece 22, each connecting element 21, as shown in FIG. 5, is moved from the magazine 20 by means of an internal conveyor or forward feed element (not depicted), for example by means of a motorized pusher, in the direction of arrow D from the magazine 20 or from a loading or supply position formed there to a processing position 23 formed within the setting tool 6a and from this position then moved by means of a screw head 24 in an axial direction parallel to the connecting element axis, i.e. in the direction of arrow E, onto the workpiece 22 and screwed into the workpiece 22 by the rotary driven screw head 24.

Preferably the setting tool 6a is designed so that after each screwing or setting process and prior to activating of the setting tool 6a for setting a further connecting element 21, a connecting element 21 respectively is automatically moved to the processing position 23.

As can be seen in the depiction of the positions a and b in FIG. 3, the housing 25 of the setting tool 6a, which (housing) also accommodates the screw head 24 and the motorized drive for the screw head 24, can be moved relative to the magazine 20 in the direction of arrow E against the effect of recoil springs for example from a starting position (position a in FIG. 3), in which the screw head 24 is outside of the processing position 23, into a working position (position b in FIG. 3). During this movement the screw head 24 is first moved into the loading or processing position 23 and then is moved increasingly further with the connecting element 21 in the direction of arrow E, namely for insertion of this connecting element into the workpiece 22. After insertion of the connecting element 21 into the workpiece 22 the housing 25 is moved back with the screw head 24 relative to the magazine 20 into the starting position.

As FIG. 3 further shows, during the setting of the respective connecting element 21 the setting tool 6a is supported on the workpiece 22 with a support surface 26 formed by the front side of the magazine 20. The front side of the magazine 20 thereby forms the setting head 10a of the setting tool 6a. The axial forward feed motion of the screw head 24 and of the respective connecting element 21 in the direction of arrow E during setting takes place for example manually by moving the housing 25 held on the housing handle 25.1 relative to the magazine 20 held or secured on the magazine handle 20.1.

The motorized drive for rotation of the screw head 24 during screwing in of the respective connecting element 21 into the workpiece 22 is for example an electric or pneumatic drive. This drive is activated for example by manual actuation of an actuating element 27, which is provided on the housing 25 in the area of the housing handle 25.1. Other possibilities for activating and controlling the motorized drive of the setting tool 6a are also conceivable. Generally it is also possible to control the motorized drive of the setting tool 6a by a sensor element, which responds to the relative position of the housing 25 in relation to the magazine 20, i.e. it switches on the motorized drive when the housing 25 has been moved relative to the magazine 20 out of the starting position. It is further possible to link the function of the actuating element 27 with a further actuating element acting between the magazine 20 and the housing 25 in the manner of an AND function, so that the motorized drive of the setting tool 6a can only be actuated when the screw head 25 is moved out of the starting position.

The supply station 7a corresponds with respect to its basic function to the supply station 7. The supply station 7a likewise comprises a feed unit for the connecting elements 21, for example in the form of a vibrating or oscillating pot, and a loading and buffer zone (not depicted), in which the connecting elements 21 are supplied in a pre-defined orientation and position, so that this supply of connecting elements 21 then is inserted into the magazine 20 after docking of the setting tool 6a onto the supply unit 7a.

The invention was described above based on exemplary embodiments. It goes without saying that modifications and variations are possible, without abandoning the underlying inventive idea on which the invention is based.

A device according to the invention for processing clamping nuts 2 was described above. It goes without saying that instead of clamping nuts 2, other functional or connecting elements can also be processed with the device according to the invention, of course by respectively adapting the respective setting tool, the supply or filling station and the magazines or buffer magazines provided there.

It was assumed above that the setting tool 6 is a hand-held tool, with which the connecting elements (e.g. clamping nuts 2) are manually set and processed. However, the setting tool 6 can also be part of an automatic processing mechanism, for example of a robot-supported system and thereby for example so that the setting tool 6, for processing of the connecting elements accommodated in the magazine 9, is taken from the supply station 7 by a robot arm or by an adapter provided there and after processing of the connecting elements, is returned to the supply station 7 for automatic refilling of the magazine 9.

It was assumed above that the filling or supply station 7 is designed for docking of a setting tool 6. A preferred embodiment of the invention provides for a filling or supply station 7 in the manner that at least two setting tools 6 can be docked independently of each other for automatic refilling of their magazines 9, so that for example during processing of the connecting elements present in the magazine 9 of a setting tool the magazine of the other setting tool 6 docked on the supply station 7 is automatically refilled with connecting elements.

REFERENCE LIST 1 device for setting clamping nuts
2 clamping nut
2.1, 2.2 leg
2.3 yoke section
2.4 open side of the clamping nut 2
3 workpiece
4, 5 openings in leg 2.2 and 2.1
6, 6a setting tool
7, 7a supply station
8 housing of setting tool 6
9 magazine in setting tool
10, 10a head end of setting tool 6 or 6a
11 processing or supply position
12 joining channel
13 ram
14 ram surface
15 actuating element for ram 13
16 supply line
17 housing of supply station
18 buffer zone or buffer magazine
19 clamping nut feed unit, e.g. vibrating or oscillating pot
20 magazine
20.1 handle on magazine
21 connecting element
22 workpiece
23 processing position
24 screw head
25 housing
25.1 housing handle
26 contact or support surface on magazine 20
27 actuating element
28 feed unit for connecting elements
A feed direction of clamping nuts 2 in magazine 9
B joining direction during setting of the clamping nuts 2
C docking and undocking movement
D movement of the connecting elements 21 into supply position
E forward feed motion
F relative motion of the housing 25 and/or of the screw head 24 relative to the magazine 20

What is claimed is:

1. A device for processing non-belted or non-connected loose connecting elements composed of two separate detachable functional units, comprising:
   a mobile setting tool comprising a setting head unit for placing a connecting element onto a workpiece; and
   a loading station unit comprising a supply station for feeding the non-belted or non-connected loose connecting elements to a magazine of the setting head unit;
   wherein the mobile setting tool contains within a housing the magazine for holding a supply of non-belted or non-connected loose connecting elements, the mobile setting tool being an independent unit that can be docked to the loading station for refilling of the magazine with the non-belted or non-connected loose connecting elements and can be detached or removed from the supply station for processing of the non-belted or non-connected loose connecting elements from the magazine without any connection between the setting tool and the loading station.

2. The device according to claim 1, wherein the mobile setting tool includes a first hand-held setting tool and a second hand-held setting tool allocated to the supply station, wherein each of the first hand-held setting tool and the second hand-held setting tool allows the magazine to be refilled while the other is in use.

3. The device according to claim 1 wherein the setting head unit of the mobile setting tool comprises an actuating element which is pneumatically, electrically or manually controlled for ejecting, setting or for supplying the supply of the non-belted or non-connected loose connecting elements at a supply position, processing position, or for setting the supply the non-belted or non-connected loose connecting element from a supply position or a processing position.

4. The device according to claim 3, wherein the setting head unit of the mobile setting tool comprises an ejecting or setting element actuated by the actuating element for setting the supply of non-belted or non-connected loose connecting elements provided in the magazine at the supply or the processing position.

5. The device according to claim 3, wherein the setting head unit of the mobile setting tool comprises a setting element, actuated by the actuating element for moving the supply of non-belted or non-connected loose connecting elements from the magazine or from the supply position there to a loading or processing position.

6. The device according to claim 1, wherein a head end of the mobile setting tool comprises at least one supply element, ejection element, or setting element for supplying or setting the supply of non-belted or non-connected loose connecting elements from the magazine or a supply position into a processing position.

7. The device according to claim 1, wherein the loading station comprises a buffer magazine or a buffer zone for supplying the non-belted or non-connected loose connecting elements in a unified, pre-defined orientation for filling the magazine of the mobile setting tool docked onto the supply station.

8. The device according to claim 1, wherein the loading station comprises a feed unit in the form of at least one vibrating or oscillating pot, for feeding the non-belted or non-connected loose connecting elements as bulk material.

9. The device according to claim 1, wherein the mobile setting tool is for setting the non-belted or non-connected loose connecting elements by screwing, pushing, pressing or pulling.

10. The device according to claim 1, wherein the setting head unit is manually moved relative to the magazine against the effect of a recoil spring from a starting position in which the setting head is outside a processing position into a working position in which the setting head is in the processing position for inserting the non-belted or non-connected loose connecting element into the workpiece.

11. The device according to claim 1, wherein the non-belted or non-connected loose connecting element is a clip, screw, bolt, rivet, blind rivet, nut, or blind nut.

* * * * *

UNITED STATES PATENT AND TRADEMARK OFFICE
CERTIFICATE OF CORRECTION

PATENT NO. : 8,695,187 B2  
APPLICATION NO. : 12/735619  
DATED : April 15, 2014  
INVENTOR(S) : Schmidt It is certified that error appears in the above-identified patent and that said Letters Patent is hereby corrected as shown below:

In the Claims

Claim 3  
Column 6, line 65 through Column 7, line 5, delete "3. The device according" to and ending "a processing position", and insert the following claim:

-- 3. The device according to claim 1 wherein the setting head unit of the mobile setting tool comprises an actuating element which is pneumatically, electrically or manually controlled for ejecting, setting or for supplying the supply of the non-belted or non-connected loose connecting elements at a supply position, processing position, or for setting the supply of the non-belted or non-connected loose connecting element from a supply position or a processing position. --

Signed and Sealed this  
Twelfth Day of August, 2014

Michelle K. Lee  
*Deputy Director of the United States Patent and Trademark Office*